May 26, 1931. F. C. MERRILIES 1,807,044
FENDER AND GUARD
Filed April 21, 1930
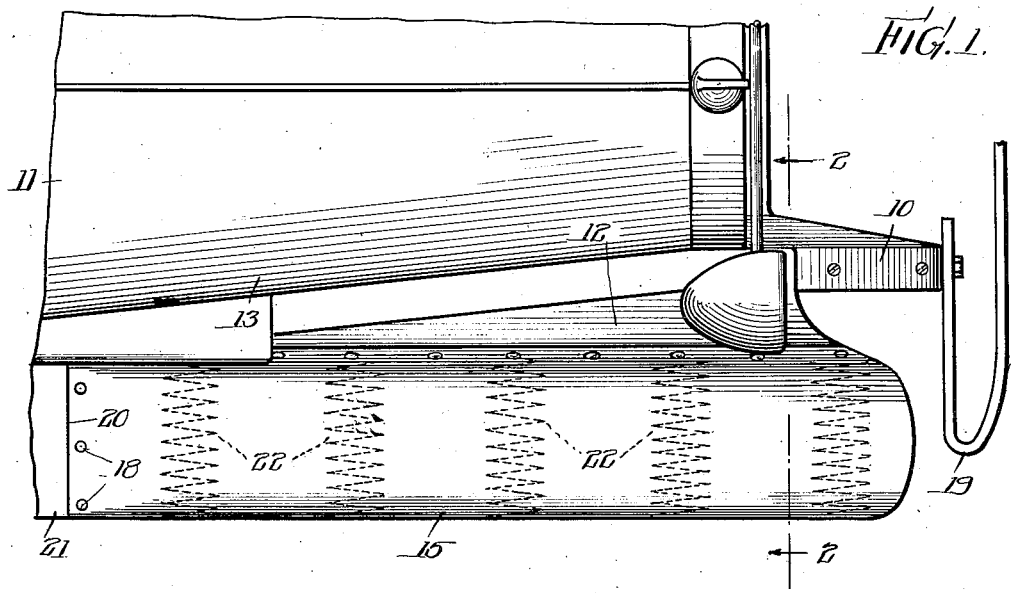
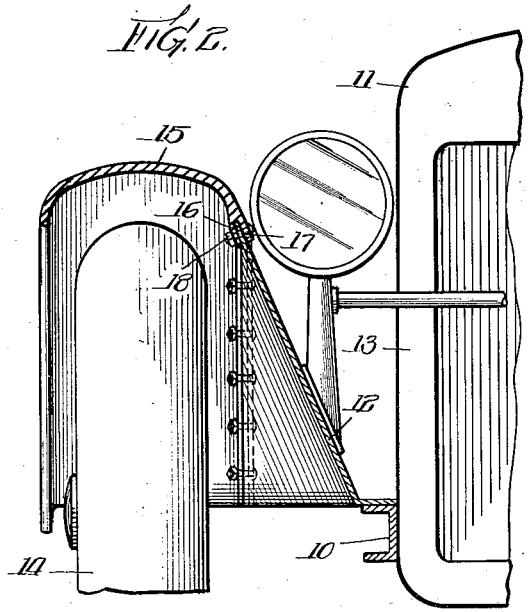
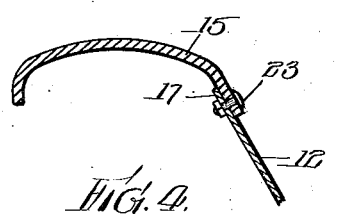
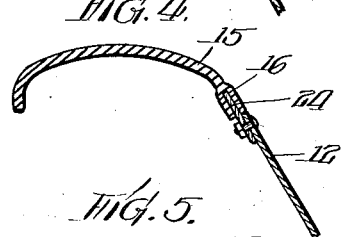
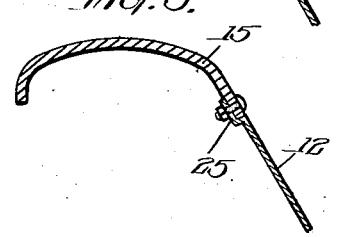
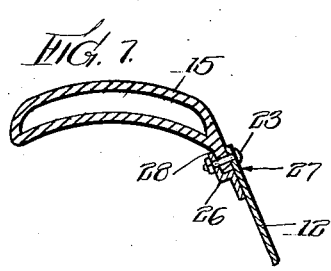
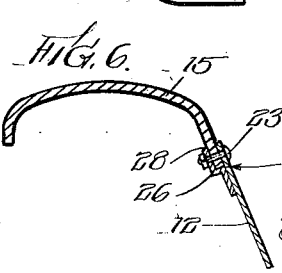
Inventor:— Floy C. Merrilies, By John A. Margall attys.

Patented May 26, 1931

1,807,044

UNITED STATES PATENT OFFICE

FLOY C. MERRILIES, OF OAK PARK, ILLINOIS

FENDER AND GUARD

Application filed April 21, 1930. Serial No. 445,932.

This invention relates to fenders and guards in general and particularly to automobile fenders and guards.

The primary object of the present invention is to provide new and novel fender and guard construction which is preferably made of yieldable material such as rubber.

Another object is to provide automobile fenders and guards which are made of rubber and which are provided with new and improved means for fastening the fenders and guards to an automobile body.

Another object is to provide improved fender construction which will absorb the shock during a collision, which will not become dented and which will yield when coming in contact with an object, and which will spring back to normal position after an impact.

A still further object is to provide fenders which may be colored during manufacture thereof or which may be colored by painting or lacquering after they are manufactured.

A still further object is to provide fenders which are resilient, which are detachably connected to an automobile body, and which may be quickly and readily applied in position.

Numerous other objects and advantages will be apparent throughout the progress of the following specification.

The invention comprises in general, automobile fenders and guards which are made of flexible or yieldable material such as rubber. These fenders are adapted to engage a groove provided on a part of an automobile and frame. Fastening means such as bolts are employed for impinging an edge of the rubber fenders in position to the automobile body.

The accompanying drawings illustrate a selected embodiment of the invention and the views therein are as follows:

Fig. 1 is a detail plan view of an automobile embodying the invention.

Fig. 2 is a detail sectional view on the line 2—2 of Fig. 1.

Figs. 3 to 6 inclusive are detail sectional views showing different ways in which the fenders may be connected to the automobile body.

Fig. 7 is a detail view of a pneumatic fender or guard.

Referring to the drawings, 10 designates the usual side bar or frame of an automobile to which the automobile body 11 is connected in the ordinary conventional manner. An apron 12 is arranged between the hood 13 and the wheels 14 in a manner well known in the art.

Fenders 15, which are preferably made of yieldable material such as rubber are each provided with a longitudinal groove 16 which receives the upper projecting end 17 of the apron 12. Bolts or rivets 18 pass through the rubber fenders and the end 17 of the apron for connecting the fenders readily but detachably to the automobile body. The fenders commence at a point rearward of the bumper 19 and extend rearwardly therefrom. The rear edge 20 of the front fender may be connected to the running board 21 by bolts or rivets 18. Rear fenders (not shown) are connected to the rear end of the running board 21 and extend over the rear wheels of the automobile similar to the conventional metal fenders.

The material from which the fenders may be made is yieldable such as rubber so that the fenders will not dent when coming in contact with the rigid parts or when bumped by another object. The conventional metal fenders when bumped or struck become dented and the finish thereon becomes scraped off. It is therefore necessary to have the fenders repaired and then to have the worn off finish replaced. The new finish stands out from the older finish and presents an unsightly appearance. In many cases however, the dents in the fenders are left to remain and the appearance of the automobile is greatly marred.

Fenders made in accordance with the present invention may have the rubber colored to harmonize with the color of the car during manufacture of the fenders. If desired, the rubber fenders may be made in natural color and then painted with the usual body paint or lacquer in any color desired.

Rubber fenders will absorb the shock during a collision and will spring back to their natural configuration. No dents will occur in the fenders as they will return to their normal and original shape. Rubber fenders will absorb the shock during a collision and also act to protect both the occupants of the car and the car itself. In cases where one car bumps or collides with another, the fenders on each car will remain unharmed, and the body of the car may also be saved from damage.

The fenders may be made of relatively hard rubber which is flexible enough to prevent cracking or breaking during an impact. It is preferable however, that the rubber be relatively flexible similar to the rubber employed in tire manufacture. The rubber may be made of and reinforced with laminated layers of canvas and strengthening means 22 may be embedded in the fenders to maintain them in their proper shape and to add strength and rigidity thereto. The strengthening means 22 may consist of zigzag shaped strengthening material which will normally hold the fender in its proper formation but which will give during an impact.

In Fig. 3, the fender 15 overlaps the end 17 of the apron 12, and fastening means such as bolts and nuts 23 pass through the fenders and the end 17 of the apron.

In Fig. 4, the fender is shown with the groove 16 engaged by a strip 24. This strip 24 is embedded in the rubber fender during its manufacture and maintained in position by adhesion of the rubber to the strip. The strip is elongated and underlaps the apron 12 as shown.

The apron 12 may be provided with an offset 25, Fig. 5, into which an edge of the fender 15 nests to bring the outside of the fender substantially even or flush with the outside of the apron 12.

In Fig. 6, there is shown another method of attaching the fender to the automobile body. In this figure, the apron 12 has a Z-bar 26 fastened to the underside thereof to provide a groove 27 into which an inner edge of the fender is received. Fastening means 23, such as bolts, pass through the apron and the leg 28 of the Z-bar for impinging the edge of the fender between the apron and the leg 28.

As shown in Fig. 7, the rubber fenders may be pneumatic and inflated with air, or they may merely be made hollow. The pneumatic guard or fender shown in Fig. 7, might even be considered preferable to the solid rubber fenders or guards shown in the other figures. The pneumatic fender provides an air cushion which will absorb the shock during compact. Also, there is less likelihood of the pneumatic fender becoming damaged, as the cushion of air inside of the fender will cause the fender to return to its normal shape when struck or bumped during a collision. This pneumatic fender may have a comparatively large air space or the air space may be relatively small, depending upon the construction preferred. Of course, a pneumatic fender having a relatively large air space may be desired as it will greatly retard any shock, but it is preferable that the fender be made of such a size that it will not present a bulky appearance. On small cars the pneumatic fenders may be made smaller, while they are made larger on larger cars and on automobile trucks. A fender of this type assists in absorbing a shock during collision and provides a yieldable cushion between the body of the car and any object which may collide with the fender. A fender, therefore, of this construction may be the means of saving a life or preventing injury to the occupants of the car during a collision and also to the occupants of another car which may collide with the car having the pneumatic fenders.

The pneumatic fender may be reinforced at intervals by the staggered members 22 shown in Fig. 1, and they may be attached to the apron 12 in any convenient manner and particularly as shown in Figs. 3 to 6.

The air space in the inflated fender is preferably greater in area than the cross sectional area of the casing, thus providing a resilient shock absorbing bumper. While the rubber is relatively heavy, it is preferable that an air space of a relatively large cross sectional area is provided to absorb a shock during a collision or impact.

The fender is preferably designed along the lines of an ordinary automatic tire and may be inflated under pressure similar to automobile tires. However, instead of being round like a regular tire, the fender is preferably formed to the conventional shape of present metal fenders.

The fenders may have a multiple of designs formed thereon by corrugations, impressions, indentations, etc., similar to treads now shown on pneumatic tires, making said fenders artistic as well as practical.

These rubber fenders are water-proof; the color will not wear or scrape off. The fenders will not rust and will maintain their usual color, form and appearance throughout their life, the same as when originally manufactured.

Instead of having the entire fender made of rubber, a portion thereof, particularly the outer edge, may be made of rubber and the balance of the fender made of sheet metal in the usual manner.

The guard may be made of rubber, or of any flexible resilient rubber-like material, but preferably is similar to the construction employed in the manufacture of automobile tires.

The invention provides a fender which will not become dented, which will absorb shocks, and which will return to its normal position after an impact with another object. The rubber fenders are quickly and easily fastened to the automobile body and may be made ornamental in design. They may be colored during manufacture or they may be painted or lacquered in the same manner in which the conventional metal fenders are painted or lacquered.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A mud guard for automobiles and made entirely of a flexible rubber-like material, the guard comprising upper and lower members connected together with side walls, said members being spaced apart a sufficient distance to provide a relatively large interior air space forming a cushion to retard an impact when said guard comes in contact with an object.

2. An automobile mud guard made entirely of relatively flexible rubber-like material comprising an outer casing formed of relatively thick walls and having an interior air space contained therein, said air space providing a cushion to retard an impact during collision.

3. An automobile mud guard made entirely of rubber material comprising an outer casing formed of relatively thick walls and having an interior air space contained therein, said air space providing a cushion to retard an impact during collision, the space in said casing adapted to be inflated to a pressure greater than atmospheric.

In witness whereof, I have hereunto subscribed my name.

FLOY C. MERRILIES.